United States Patent [19]
Hurwitt

[11] 3,953,703
[45] Apr. 27, 1976

[54] METHOD FOR DRYING CERAMIC TAPE
[75] Inventor: Steven Hurwitt, Park Ridge, N.J.
[73] Assignee: Materials Research Corporation, Orangeburg, N.Y.
[22] Filed: Oct. 3, 1974
[21] Appl. No.: 511,673

[52] U.S. Cl. ............................ 219/10.55 M; 34/1; 219/10.55 A
[51] Int. Cl.[2] .......................................... H05B 9/06
[58] Field of Search ............ 219/10.55 A, 10.55 R, 219/10.55 M; 34/1

[56] References Cited
UNITED STATES PATENTS

| | | | |
|---|---|---|---|
| 3,704,523 | 12/1972 | Guerga et al. ................ | 219/10.55 A |
| 3,851,132 | 11/1974 | Van Koughnett ............ | 219/10.55 A |
| 3,858,329 | 1/1975 | Koide et al. ................. | 219/10.55 A |
| 3,859,493 | 1/1975 | Peterson ...................... | 219/10.55 A |

*Primary Examiner*—Bruce A. Reynolds
*Attorney, Agent, or Firm*—Kenyon & Kenyon Reilly Carr & Chapin

[57] ABSTRACT

In the manufacture of ceramic products by the tape casting process faster drying rates result from subjecting the layer of cast ceramic slip to high frequency electromagnetic energy evenly distributed along at least the initial portion of the length of a drying chamber and of sufficient intensity to heat the slip to a uniform cross-sectional temperature above the evaporation temperature of the solvent. The high frequency energy, preferably in the microwave range, raises the temperature of the cast slip uniformly to evaporate the volatile solvents from the interior without forming a barrier skin on the surface of the layer. For typical slip thickness, tape speed, and solvent composition, energy densities of about 1 watt per square inch will provide an optimum heating rate without boiling the solvent.

3 Claims, 2 Drawing Figures

METHOD FOR DRYING CERAMIC TAPE

BACKGROUND OF THE INVENTION

1. Field of the Invention

This invention relates generally to the manufacture of ceramic items and particularly to improvements in the manufacture of thin flat ceramic substrates by the tape casting process.

2. Description of the Prior Art

The art of manufacturing thin flat ceramic items has been developed to meet the need for capacitor dielectrics and for substrates in microelectronic and semiconductor circuitry, among other uses. The common method for manufacturing such articles is by the tape casting process. In this process a fluid ceramic slurry, called a slip, is made by mixing together a finely ground ceramic powder, such as aluminum oxide (alumina), with suitable amounts of an organic binder, a volatile solvent, usually a plasticizer, and possibly small amounts of other materials, depending on the product requirements. Typical ingredients are identified, and the mixing and casting process are fully described in U.S. Pat. No. 2,966,719, issued to J. L. Park, Jr. on Jan. 3, 1961 as assignor to American Lava Corporation, and in U.S. Pat. No. 3,698,923, issued to H. W. Stetson et al. on Oct. 17, 1972 as assignors to Western Electric Company, Incorporated. The reader is referred to these patents and also to the earlier U.S. Pat. No. 2,582,993, issued to G. N. Howatt on Jan. 22, 1952, for details of the tape casting process and its developmental history as well as for the characteristics of the resulting ceramic product.

Briefly, the process involves discharging the abovedescribed ceramic slip, which has a viscosity and consistency approximately the same as heavy cream, from a reservoir onto a supported, moving surface, preferably a plastic tape or film such as cellulose acetate, polytetrafluoroethylene ("Teflon"), or glycol terephthalic acid ester ("Mylar"). The film is usually in the form of an elongated strip several hundred feet long and from ½ to 2 feet wide, wound on a storage reel mounted next to the reservoir.

The tape is led from the storage reel under the reservoir to a takeup reel, and a suitable drive mechanism moves the tape in a substantially horizontal path from the storage reel to the takeup reel. The cast slip is distributed evenly on the moving tape by an inverted dam forming the outlet of the reservoir or by a doctor blade in order to form a layer of uniform and controlled thickness.

As the layer of cast slip is conveyed on the plastic tape from the reservoir, the volatile solvents evaporate, the process of driving off the solvents being accelerated by passing the tape through an elongated, heated drying chamber. The resulting product is a ceramic tape that is aptly described as "leather hard". This tape can be punched or sliced into the shape and size desired for the substrate or other item and then be fired at high temperature (e.g. 1500°C) to produce a rigid ceramic article.

The critical factor limiting the production speed of dried, "green" ceramic tape (i.e. leather-hard tape) is the rate of evaporation of the solvents from the layer of cast slip. In conventional drying chambers the traditional means for heating the slip are warm flowing air or infra-red heaters. Both of these methods aggravate the drying problem by heating and drying the surface before the bulk of the layer has been warmed to the evaporation temperature of the solvent. This surface heating further dries and hardens the skin that tends to form even in ambient air temperatures and thereby retards evaporation from the still fluid interior of the layer.

As a result, in order to obtain reasonable tape speeds, typically of about 2 feet per minute, through the drying chamber, the tape casting production line must be as much as 150 feet long to provide the necessary time within the drying chamber for all the volatile solvents to evaporate. If hotter air is used to bring the temperature of the slip up more quickly, the surface drying and hardening effect is more pronounced, and more rapid evolution of solvent vapors from the interior tends to produce bubbles in the skin and voids in the interior of the tape product.

SUMMARY OF THE INVENTION

It is a primary object of the present invention to provide an improved method and apparatus for drying a layer cast ceramic slip.

Another object of the invention is to shorten the drying time required to produce "green" ceramic tape by the tape casting process.

These and other objects of the invention are achieved by subjecting the layer of cast ceramic slip to high frequency electromagnetic energy in the microwave range as the layer is conveyed through a drying chamber on a continuously moving flat surface. The microwave energy is substantially evenly distributed along the initial portion of the drying chamber and is of sufficient intensity to heat the layer to a substantially uniform cross-sectional temperature above the evaporation temperature of the solvent in the slip mixture, but not of such a high intensity as to cause overheating or boiling of the solvent.

The frequency of electromagnetic energy is preferably above 1000 MHZ and may be approximately 2500–3000 MHZ. Power requirements depend on the speed of tape transport, the thickness of the ceramic layer, the evaporation temperatures of the solvents used in the slip mixture, and area of tape exposed. For typical operations, the power produced by the microwave generator can be less than 1000 watts to obtain a beneficial effect.

The above and other features of the present invention will be apparent from the following description of the preferred embodiment and the accompanying sheet of drawing.

The intended use of microwave energy is to supplement, rather than replace, conventional drying means. The established principles of microwave heating depend on coupling of high frequency oscillations to polar molecules within the material to be heated. The heat is generated within the bulk of the material as a result of molecular agitation, rather than being conducted in from the surface as with conventional heating means. This permits heating of the cast slip throughout prior to the formation of an evaporation retarding skin. Warm air is used in a conventional manner to transport evaporated vapors away from the slip surface; otherwise a saturated air layer might form, preventing further drying.

A microwave cavity for practicing the method of the invention includes a central portion containing a means for generating high frequency electromagnetic energy in the microwave range and a pair of cavity extensions opening into opposite sides of the central portion. The purpose of these extensions is to distribute the available microwave power over a larger area of cast slip, thereby reducing the power density to a value consistent with proper heating rate. This value depends on slip width, thickness, tape speed and type of solvent, but is typically of the order of 1 watt per square inch. The cavity extensions are properly proportioned, according to the wavelength of the energy being used, for minimum attentuation of the energy provided by the generating means.

To assure uniform energy distribution, rotating microwave reflectors are positioned in both the central portion and the cavity extensions. The rotating reflector in the central portion preferably includes a vertical shaft rotatably mounted in the center of the portion, means for rotating the shaft about its longitudinal axis, and a plurality of reflecting vanes extending perpendicularly to the lower end of the shaft in angularly spaced relation.

The rotating reflectors in the cavity extensions preferably include a plurality of horizontal shafts rotatably mounted in longitudinally spaced relation with their axes transverse to the longitudinal dimension of the cavity extensions, at least one reflecting vane mounted on each shaft; and means for rotating the shafts about their longitudinal axes.

DESCRIPTION OF THE PREFERRED EMBODIMENT

Figure 1:
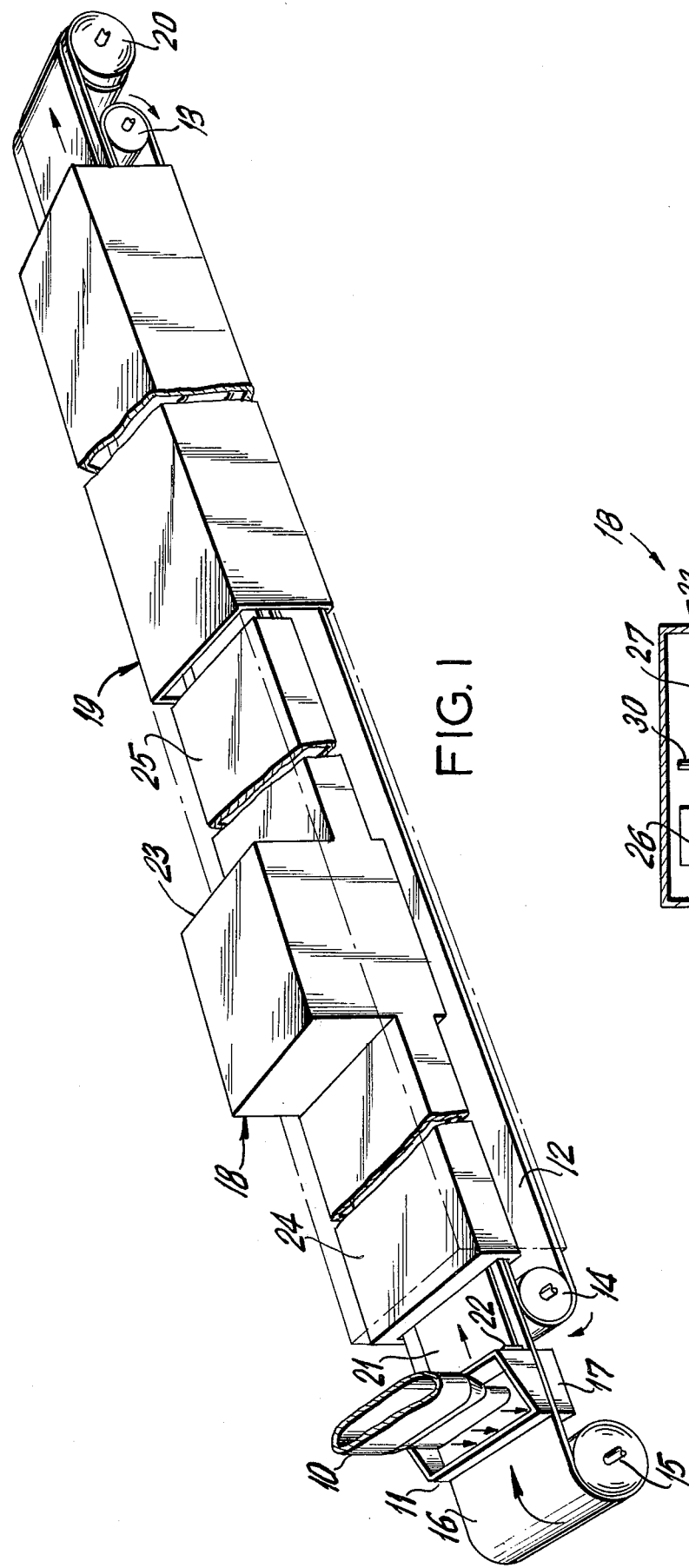
FIG. 1 is a perspective view of a tape casting apparatus feeding a continuously moving layer of ceramic slip into a drying chamber.

Referring to FIG. 1, a typical tape casting line includes a reservoir 10 for a ceramic slip located above a distribution station in the form of an inverted-weir box 11 near one end of a conveying means represented by an endless conveyor belt 12 trained around spaced rollers 13 and 14. A storage reel 15 positioned near the entrance to the conveyor is wound with an elongated tape or sheet of flexible plastic film 16. The film may be cellulose acetate "Mylar", "Teflon", or other material, preferably from ½–2 feet wide and about 0.002–0.020 inch thick.

Film 16 is led from the storage reel over a support plate 17 onto the conveyor belt 12 and thence into a microwave cavity 18 positioned adjacent to the entrance of a conventional drying chamber 19. Alternatively the microwave cavity may be positioned inside the entrance of an otherwise conventional drying chamber, as shown by the dashed lines in FIG. 1. From the other end of the drying chamber the tape proceeds to a takeup reel 20. Conventional motor drive means (not shown) rotate the conveyor rollers and the takeup reel to move the plastic film at a substantially constant rate from the storage reel to the takeup reel. The plastic film provides a moving, flat, support surface for conveying a layer 21 of ceramic slip distributed evenly onto the surface of the film at a predetermined thickness by an adjustable doctor blade 22 mounted at the open end of weir box 11.

The thickness of the cast slip is determined by the height of the doctor blade above the surface of the support film, the speed of movement of the film, the viscosity of the slip, and the head of the slip in the weir box. A typical layer thickness may be 0.035–0.038 inch, but thinner and thicker layers may be made, depending on the requirements for the fired ceramic end product, by techniques well known to those skilled in the art.

The slip comprises a mixture of finely ground ceramic material, a volatile solvent, a suitable organic binder, and possibly other ingredients such as a wetting agent, a plasticizer, and so forth.

Figure 2:
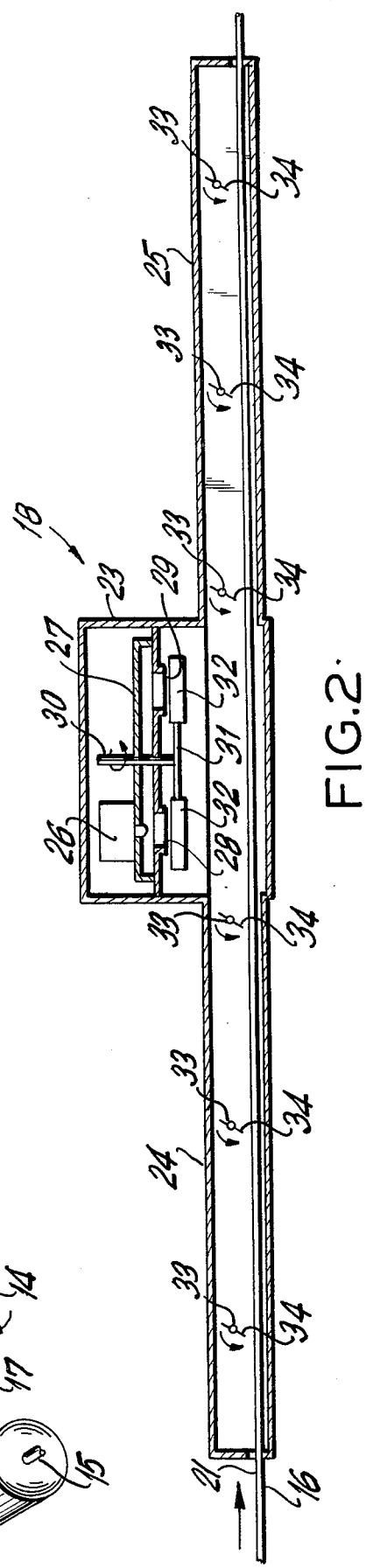
FIG. 2 is a side view in section of a microwave drying cavity for practicing the method of the present invention.

Referring to FIG. 2, a microwave cavity for practicing the method of the present invention may comprise a central portion 23 and a pair of elongated cavity extensions 24 and 25 opening from opposite sides of the central portion. The length of each cavity extension may be about 3 feet, and the length of the center portion may be approximately 2–3 feet; so that the total length of the drying chamber is only 8–9 feet.

The central portion 23 contains a means for generating high frequency electromagnetic energy such as a microwave tube 26. The microwave tube feeds into waveguide 27 which, in turn, has openings 28 and 29 for distributing the electromagnetic energy uniformly throughout the central portion. To assist the uniform distribution of energy a rotating reflector is mounted in the central portion. This reflector includes a vertical shaft 30 rotatably mounted in the center of the central portion, and a horizontal bar 31 carrying reflector vanes 32 at either end is attached at the lower end of the vertical shaft. Drive means (not shown) rotate the vertical shaft at constant speed around its longitudinal axis.

The above-described central portion may be constructed by modifying a commercially available microwave oven, for example, a model 99221 sold by Sears Roebuck & Co. Such an oven produces approximately 700 watts of microwave energy at a frequency of about 2850 MHZ.

The oven modifications include cutting open the sides for attachment of cavity extensions 24 and 25 in order to provide sufficient cavity length to bring the cast slip layer up to the solvent evaporation temperature at the proper rate to prevent overheating. To distribute energy within the cavity extensions, additional rotating reflectors are provided in the form of rotatably mounted horizontal shafts 33 carrying reflecting vanes 34. The horizontal shafts are continuously rotated by drive means (not shown).

Although the cavity embodiment of FIG. 2 is simple and economical to construct, it will be appreciated that other cavity designs for accomplishing the same function will fall within the scope of the invention.

After the slip has been raised to an even temperature sufficient to evaporate the solvents, this temperature is maintained by the flow of heated air in the remaining length of the otherwise conventional chamber 19. The warm flow also carries away the solvent vapors to prevent formation of a solvent-saturated air layer above the surface of the tape that would retard the further drying of the tape.

I claim:

1. In a process for manufacturing ceramic products of the type that includes mixing finely ground ceramic material with a volatile solvent and a binder to form a slip, distributing the slip in a layer onto a continuously moving surface, conveying the ceramic layer on the moving surface through a drying chamber, circulating a flow of heated air through the drying chamber for evaporating the solvent to produce a dry ceramic tape, the improved method of drying the slip layer comprising the sequential steps of:

subjecting the layer of slip to ultra high frequency electromagnetic energy substantially evenly distributed along the length of the moving tape in a region adjacent to the entrance of the drying chamber, the intensity of the electromagnetic energy being on the order of 1 watt per square inch and the length of distribution of the electromagnetic energy being less than the length of the drying chamber but being sufficient to heat the slip uniformly to the evaporation temperature of the solvent without boiling the solvent, and completing the evaporation of the solvent from the slip only by the circulation of heated air as the slip is conveyed through the drying chamber.

2. The method of claim 1 wherein the region of distribution of the ultra high frequency electromagnetic energy is located in front of the entrance to the drying chamber.

3. The method of claim 1 wherein the regions of distribution of the ultra high frequency electromagnetic energy is located inside the drying chamber.

* * * * *